US012664664B2

(12) United States Patent
Connors et al.

(10) Patent No.: US 12,664,664 B2
(45) Date of Patent: Jun. 23, 2026

(54) AUTOMATED IMAGE PROCESSING SYSTEM

(71) Applicant: STATS LLC, Chicago, IL (US)

(72) Inventors: Paul Connors, Charlotte, NC (US); Rashmi Shivanna, Bangalore (IN); Ritu Rajiv Choudhari, Sangli (IN)

(73) Assignee: STATS LLC, Chicago, IL (US)

( * ) Notice: Subject to any disclaimer, the term of this patent is extended or adjusted under 35 U.S.C. 154(b) by 409 days.

(21) Appl. No.: 18/146,755

(22) Filed: Dec. 27, 2022

(65) Prior Publication Data

US 2023/0215014 A1     Jul. 6, 2023

Related U.S. Application Data

(60) Provisional application No. 63/266,441, filed on Jan. 5, 2022.

(51) Int. Cl.
*G06T 7/194* (2017.01)
*G06F 16/51* (2019.01)
(Continued)

(52) U.S. Cl.
CPC ............. *G06T 7/194* (2017.01); *G06F 16/51* (2019.01); *G06T 1/60* (2013.01); *G06T 3/40* (2013.01);
(Continued)

(58) Field of Classification Search
CPC .. G06T 7/194; G06T 1/60; G06T 3/40; G06T 2207/30196; G06T 2207/30221; G06T 7/11; G06F 16/51
See application file for complete search history.

(56) References Cited

U.S. PATENT DOCUMENTS 8,269,793 B2   9/2012  Elgar et al.
8,995,792 B2   3/2015  Hatano
(Continued)

FOREIGN PATENT DOCUMENTS

CN        110047053  A    7/2019
JP       2008227997  A    9/2008

OTHER PUBLICATIONS

Boone, J. (Oct. 22, 2018). Speed Up Your Workflow with Good File Naming Conventions. Frame.io Insider. https://blog.frame.io/2018/10/22/file-naming-conventions/ (Year: 2018).*
(Continued)

*Primary Examiner* — Gregory A Morse
*Assistant Examiner* — David Alexander Wambst
(74) *Attorney, Agent, or Firm* — Bookoff McAndrews, PLLC

(57) ABSTRACT

A computing system receives an image for processing. The image includes at least a player of interest. The computing system executes an image processing workflow for automatically processing the image in accordance with standards set by an organization associated with the computing system. The executing includes removing, via a background module, background pixels from the image. The executing further includes, after removing the background pixels, resizing, via a resizing module, the image to a set size defined by the organization. The executing further includes, after resizing the image, renaming, via a renaming module, the image to a name format defined by the organization. After executing the image processing workflow, the computing system saves the image to a database for retrieval. The removing, the resizing, and the renaming are performed without user intervention.

15 Claims, 4 Drawing Sheets

(51) Int. Cl.
    *G06T 1/60*          (2006.01)
    *G06T 3/40*          (2006.01)

(52) U.S. Cl.
    CPC ............... *G06T 2207/30196* (2013.01); *G06T 2207/30221* (2013.01)

(56)          References Cited

U.S. PATENT DOCUMENTS

| | | | |
|---|---|---|---|
| 2002/0154322 A1 | 10/2002 | Tretter | |
| 2008/0158612 A1 | 7/2008 | Iwasaki | |
| 2014/0072243 A1 | 3/2014 | Gao et al. | |
| 2015/0379300 A1 | 12/2015 | Terada et al. | |
| 2015/0379722 A1* | 12/2015 | Goldberg ................. | G06T 3/20 |
| | | | 382/298 |

OTHER PUBLICATIONS

Gatis, D. (Aug. 24, 2020). Rembg. GitHub. https://github.com/danielgatis/rembg Background removal script (Year: 2020).*

Rosebrock, A. (Jul. 27, 2020). OpenCV GrabCut: Foreground Segmentation and Extraction. PylmageSearch. https://pyimagesearch.com/2020/07/27/opencv-grabcut-foreground-segmentation-and-extraction/ Foreground-background segmentation using OpenCV (Year: 2020).*

Image dimension validation. contentstack.com. (Dec. 21, 2019). https://www.contentstack.com/docs/developers/create-content-types/image-dimension-validation (Year: 2019).*

Barr, J. (Nov. 21, 2012). SQS Queues and SNS Notifications—Now Best Friends | AWS News Blog. Aws.amazon.com. https://aws.amazon.com/blogs/aws/queues-and-notifications-now-best-friends/ (Year: 2012).*

Scott. (Dec. 23, 2016). HandBrake Documentation—Automatic File Naming. Handbrake.fr. https://handbrake.fr/docs/en/latest/technical/automatic-file-naming.html (Year: 2016).*

Humphries, M. (Nov. 3, 2021). Dropbox Can Now Automatically Organize Folders and Rename Files. PCMAG; PCMag. https://www.pcmag.com/news/dropbox-can-now-automatically-organize-folders-and-rename-files?test_uuid=04IpBmWGZleS010J3epvMrC&test_variant=A (Year: 2021).*

EnovaPoint. (Jan. 13, 2020). Document naming automation—JungleDocs Documentation. Enovapoint.com. https://help-jungledocs.enovapoint.com/article/706-document-naming-automation (Year: 2020).*

Gordon G., et al., "Background Estimation and Removal Based on Range and Color", IEEE Computer Society Conference on Computer Vision and Pattern Recognition, Jun. 1999, 6 pages.

International Search Report and Written Opinion for Application No. PCT/US2022/082417, mailed on Mar. 31, 2023, 8 Pages.

* cited by examiner

300

AUTOMATED IMAGE PROCESSING SYSTEM

CROSS-REFERENCE TO RELATED APPLICATIONS

This application claims priority to U.S. Provisional Application Ser. No. 63/266,441, filed Jan. 5, 2022, which is hereby incorporated by reference in its entirety.

FIELD OF THE DISCLOSURE

The present disclosure generally relates to an automated image processing system and a method of operating the same.

BACKGROUND

In sports, the onus of processing images typically falls on human operators. Headshots of players are used in a variety of instances. For example, headshots of players are used on sport websites (e.g., ESPN) and newspapers, as well as on television broadcasts. The process of formatting, resizing, and naming such images is a labor intensive one that consumes hours of operator power.

SUMMARY

In some embodiments, a method is disclosed herein. A computing system receives an image for processing. The image includes at least a player of interest. The computing system executes an image processing workflow for automatically processing the image in accordance with standards set by an organization associated with the computing system. The executing includes removing, via a background module, background pixels from the image. The executing further includes, after removing the background pixels, resizing, via a resizing module, the image to a set size defined by the organization. The executing further includes, after resizing the image, renaming, via a renaming module, the image to a name format defined by the organization. After executing the image processing workflow, the computing system saves the image to a database for retrieval. The removing, the resizing, and the renaming are performed without user intervention.

In some embodiments, a non-transitory computer readable medium is disclosed herein. The non-transitory computer readable medium includes one or more sequences of instructions, which, when executed by one or more processors, causes a computing system to perform operations. The operations include receiving, by the computing system, an image for processing. The image includes at least a player of interest. The operations further include executing, by the computing system, an image processing workflow for automatically processing the image in accordance with standards set by an organization associated with the computing system. The executing includes removing, via a background module, background pixels from the image. The executing further includes, after removing the background pixels, resizing, via a resizing module, the image to a set size defined by the organization. The executing further includes, after resizing the image, renaming, via a renaming module, the image to a name format defined by the organization. The operations further include, after executing the image processing workflow, saving, by the computing system, the image to a database for retrieval. The removing, the resizing, and the renaming are performed without user intervention.

In some embodiments, a system is disclosed herein. The system includes a processor and a memory. The memory has programming instructions stored thereon, which, when executed by the processor, causes the system to perform operations. The operations include receiving an image for processing. The image includes at least a player of interest. The operations further include executing an image processing workflow for automatically processing the image in accordance with standards set by an organization associated with the system. The executing includes removing, via a background module, background pixels from the image. The executing further includes, after removing the background pixels, resizing, via a resizing module, the image to a set size defined by the organization. The executing further includes, after resizing the image, renaming, via a renaming module, the image to a name format defined by the organization. The operations further include, after executing the image processing workflow, saving the image to a database for retrieval, wherein the removing, the resizing, and the renaming is performed without user intervention.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein provide an automated image processing system that allows organizations to push pre-formatted raw images through a series of automated steps to remove the background, resize, rename, and move into the appropriate folder for delivery. Such system provides an improvement over conventional systems that are highly manual, in favor of an automated solution making the process much faster while removing any possibility of manual error.

Figure 1:
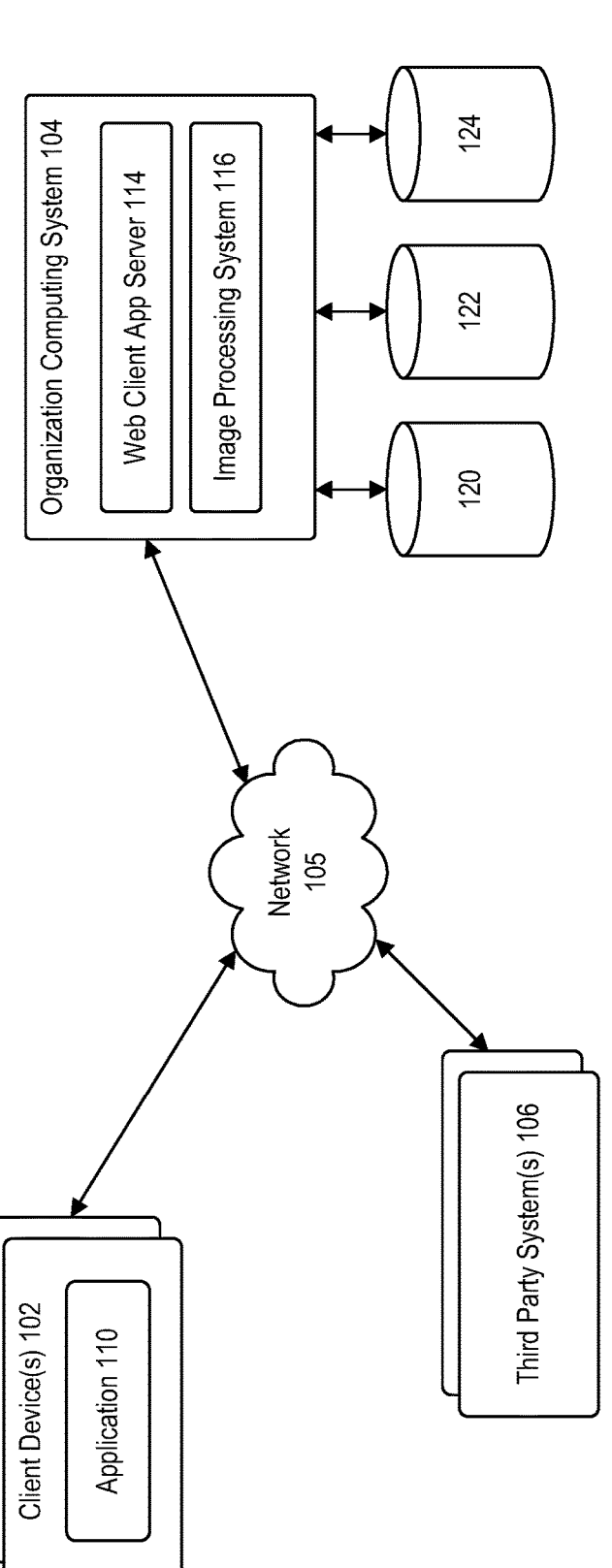
FIG. 1 is a block diagram illustrating a computing environment, according to example embodiments.

FIG. 1 is a block diagram illustrating a computing environment 100, according to example embodiments. Computing environment 100 may include one or more client devices 102, organization computing system 104, and one or more third party systems 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Client device 102 may be operated by a user. For example, client device 102 may be a mobile device, a tablet, a desktop computer, or any computing system having the capabilities described herein. Client device 102 may include at least application 110. In some embodiments, application 110 may be representative a standalone application associated with organization computing system 104. In some embodiments, application 110 may be representative of a web browser that allows access to a website associated with organization computing system 104. Client device 102 may access application 110 to access content or functionality associated with organization computing system 104.

In some embodiments, client device 102 may communicate over network 105 to request that organization computing system 104 process an uploaded image. For example, client device 102 may be configured to execute application 110 to access image processing system 116 associated with organization computing system 104. The content that is displayed to client device 102 may be transmitted from web client application server 114 to client device 102, and subsequently processed by application 110 for display through a graphical user interface (GUI) of client device 102.

Client device 102 may be configured to communicate with organization computing system 104 via network 105. Organization computing system 104 may include at least a web client application server 114 and image processing system 116. Image processing system 116 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Image processing system 116 may be configured to receive, for processing, an image uploaded by client device 102. For example, image processing system 116 may receive an image uploaded by client device 102 via application 110 executing thereon. Image processing system 116 may execute a series of automated processes in which the image processing system removes the background from the image, resizes the image, renames the image, and moves the image to an appropriate folder for delivery to client device 102. The details of image processing system 116 are described in further detail below, in conjunction with FIG. 2.

In some embodiments, image processing system 116 may communicate with one or more third party systems 106. For example, image processing system 116 may communicate with a third party system 106 via one or more application programming interfaces (APIs) to access a library for removing background data from an image.

As shown, in some embodiments, organization computing system 104 may communicate with one or more databases: database 120, database 122, and database 124. Each of database 120, database 122, and database 124 may be configured to store processed images following the workflow executed by the image processing system 116. For example, each of database 120, database 122, and database 124 may be configured to store a respective filetype. Using a specific example, database 120 may be configured to store images having a first naming convention (e.g., a STATS identifier); database 122 may be configured to store images having a second naming convention (e.g., a UUID); and database 124 may be configured to store images having a third naming convention (e.g., Opta identifier).

In some embodiments, the identifiers associated with each image may correspond to additional data maintained by organization computing system 104. For example, based on the STATS identifier, a user may be able to retrieve information about a player depicted in the image. In some embodiments, such information may include statistics regarding the player in the image.

Figure 2:
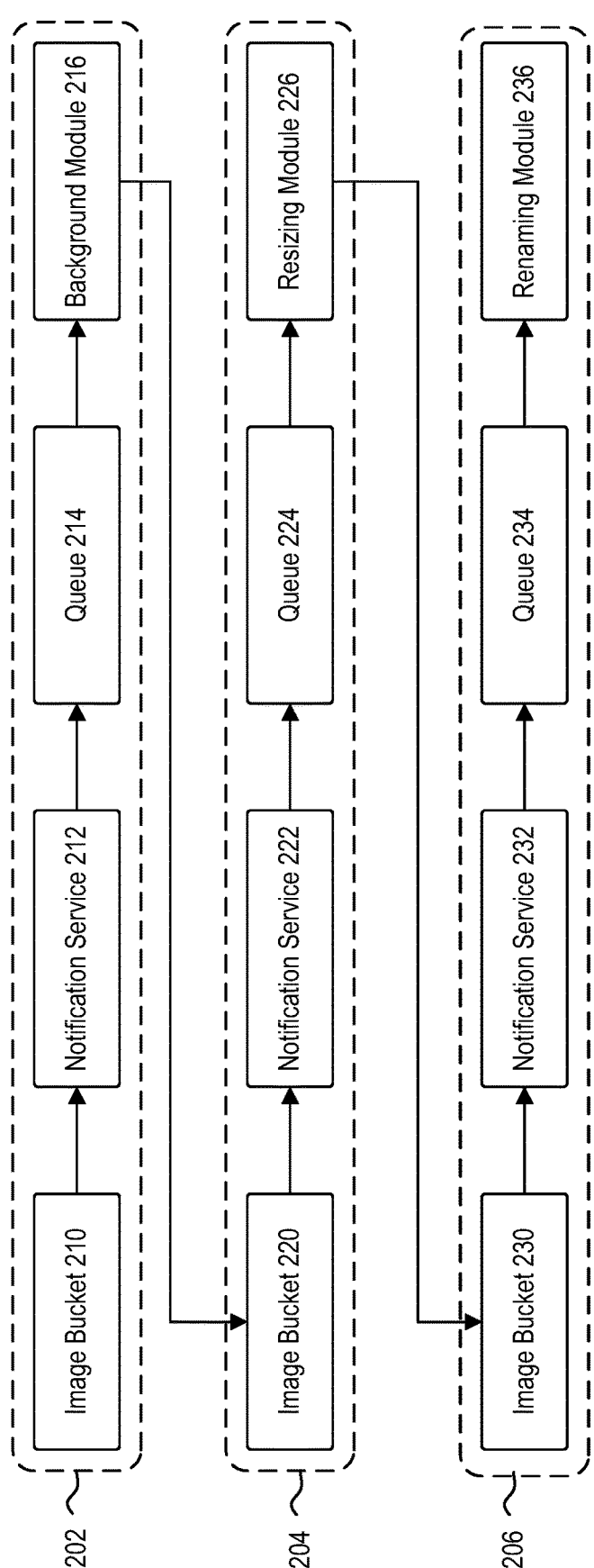
FIG. 2 is a block diagram illustrating an exemplary workflow initiated by an image processing system, according to example embodiments.

FIG. 2 is a block diagram illustrating an exemplary workflow 200 initiated by image processing system 116, according to example embodiments.

As shown, workflow 200 may include a plurality of sub-processes 202-206. Subprocess 202 may correspond to a process for removing background data from an image. Subprocess 204 may correspond to a process for resizing the image. Subprocess 206 may correspond to a process for renaming the image.

As shown, workflow 200 may begin with subprocess 202. Subprocess 202 may include a plurality of components, such as, but not limited to, an image bucket 210, a notification service 212, a queue 214, and a background module 216.

In operation, a user may upload an image for processing to image processing system 116 via application 110 executing on client device 102. In some embodiments, image processing system 116 may determine whether the image satisfies preset requirements for processing. For example, in some embodiments, image processing system 116 may only be configured to process images that comply with certain standards. In some embodiments, image processing system 116 may scan the image to determine whether the image complies with the correct starting size for an image (e.g., 1080×1440, 1440×1440, etc.).

In some embodiments, image processing system 116 may scan the image to determine whether the image complies with the proper naming conventions. For example, as described above, organization computing system 104 may maintain three databases 120-124, each database dedicated to a certain naming convention. In some embodiments, when image processing system 116 receives the image for processing, image processing system 116 may determine whether the image has the proper naming convention. In some embodiments, the proper naming convention include three identifiers. For example, for a given image, the following may be considered the proper naming convention: <STATSID1, UUID1, OPTAID1.jpeg>. As shown, each of the identifiers in the name of the image file corresponds to a respective database 120-124.

As those skilled in the art recognize, such pre-processing is not a requirement to processing an image request.

Image processing system 116 may upload the received image to image bucket 210. Image bucket 210 may be dedicated to images that are to undergo a background removal process. In some embodiments, image bucket 210 may be representative of an S3 bucket. Notification service 212 may be configured to monitor image bucket 210. For example, notification service 212 may be configured to monitor image bucket 210 to determine when there is a new image available for processing. In some embodiments, notification service 212 may be representative of Amazon Simple Notification Service.

Upon detecting a new image in image bucket 210, notification service 212 may move the image to queue 214. Queue 214 may maintain an ordering of images that are to undergo the background removal process. In some embodiments, queue 214 may be representative of Amazon Simple Queue Service.

Background module 216 may be configured to remove background data from the image. In some embodiments, background module 216 may be configured to remove background data from the image by executing a script that identifies and removes background pixels from the image. In some embodiments, background module 216 may utilize a third party service hosted on third party system 106. For example, background module 216 may utilize one or more APIs to access a background removal process hosted by a third party system 106, such as, but not limited to, remove.bg.

Subprocess 204 may include a plurality of components, such as, but not limited to, an image bucket 220, a notification service 222, a queue 224, and a resizing module 226.

After background module 216 removes the background from the image, background module 216 may upload the image to image bucket 220. Image bucket 220 may be dedicated to images that are to undergo a resizing process. In some embodiments, image bucket 220 may be representative of an S3 bucket. Notification service 222 may be configured to monitor image bucket 220. For example, notification service 222 may be configured to monitor image bucket 220 to determine when there is an image available for resizing. In some embodiments, notification service 222 may be representative of Amazon Simple Notification Service.

Upon detecting an image added to image bucket 220, notification service 222 may move the image to queue 224. Queue 224 may maintain an ordering of images that are to undergo the resizing process. In some embodiments, queue 224 may be representative of Amazon Simple Queue Service.

Resizing module 226 may be configured to resize the image. In some embodiments, resizing module 226 may be configured to resize the image in accordance with a pre-set requirement or preference set by organization computing system 104.

Subprocess 206 may include a plurality of components, such as, but not limited to, an image bucket 230, a notification service 232, a queue 234, and a renaming module 236.

After resizing module 226 resizes the image, resizing module 226 may upload the image to image bucket 230.

Image bucket 230 may be dedicated to images that are to undergo a renaming process. In some embodiments, image bucket 230 may be representative of an S3 bucket. Notification service 232 may be configured to monitor image bucket 230. For example, notification service 232 may be configured to monitor image bucket 230 to determine when there is an image available for renaming. In some embodiments, notification service 232 may be representative of Amazon Simple Notification Service.

Upon detecting an image added to image bucket 230, notification service 232 may move the image to queue 234. Queue 234 may maintain an ordering of images that are to undergo the renaming process. In some embodiments, queue 234 may be representative of Amazon Simple Queue Service.

Renaming module 236 may be configured to rename the image. In some embodiments, resizing module 226 may be configured to rename the image in accordance with the file name of the image when uploaded. For example, as provided above, in some embodiments, image processing system 116 may require that the image conform to certain naming standards prior to upload. Renaming module 236 may rename the image based on the image naming requirements. For example, as output, renaming module 236 may generate three image files of the same image. Each image file may be renamed according to one of the identifiers in the original naming convention. Continuing with the above example, renaming module 236 may generate a first image that is renamed <STATSID1.jpeg>; a second image that is renamed <UUID1.jpeg>; and a third image that is renamed <OPTAID1.jpeg>.

Following workflow 200, image processing system 116 may save each image in a respective database. For example, the first image, <STATSID1.jpeg>, may be stored in database 120; the second image, <UUID1.jpeg>, may be stored in database 122; and the third image, <OPTAID1.jpeg>, may be stored in database 124.

Figure 3:
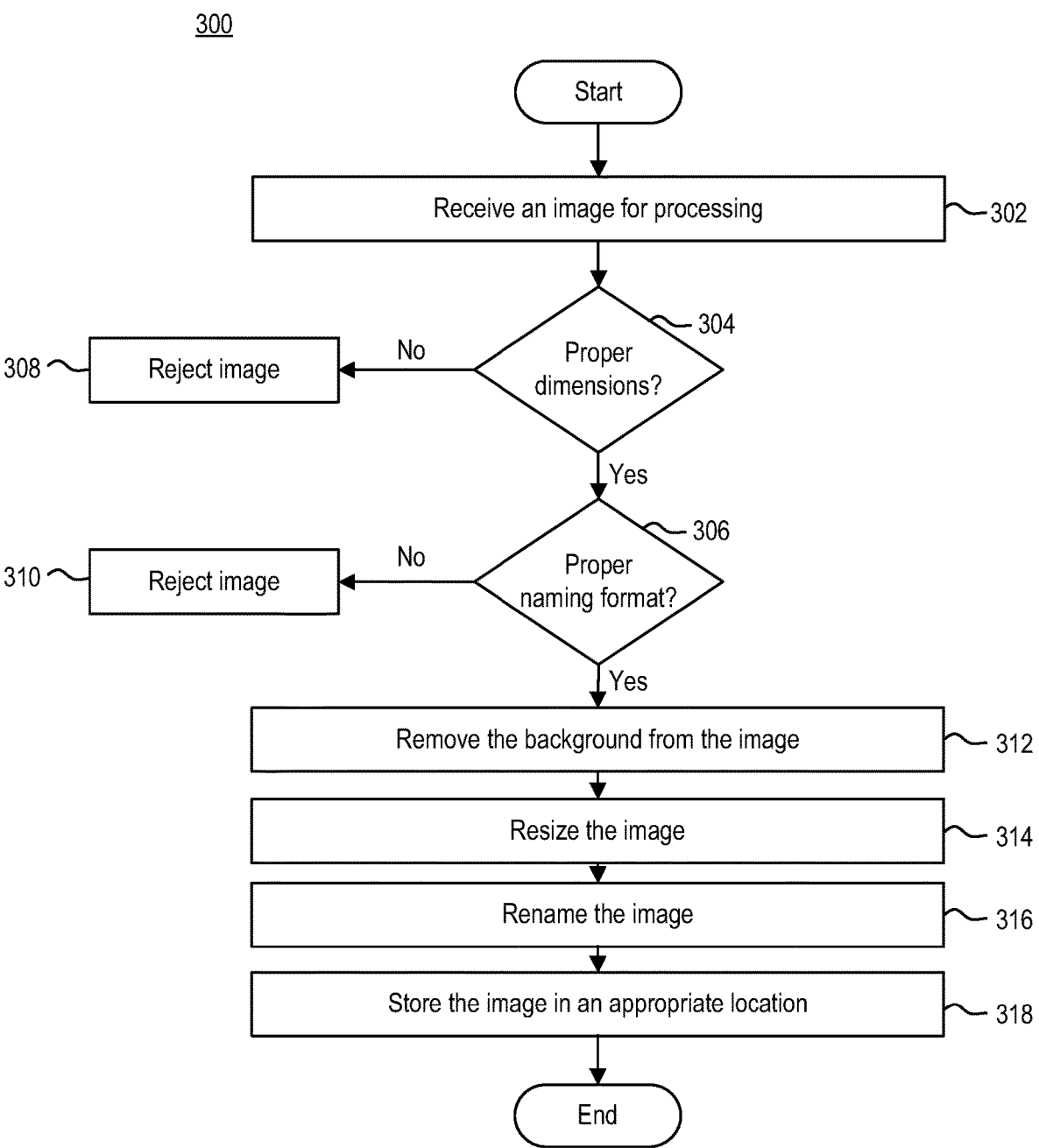
FIG. 3 is a flow diagram illustrating a method of processing an image, according to example embodiments.

FIG. 3 is a flow diagram illustrating a method 300 of processing an image, according to example embodiments. Method 300 may begin at step 302.

At step 302, organization computing system 104 may receive an image for processing. In some embodiments, image processing system 116 may receive an image for processing from client device 102 via application 110 executing thereon. In some embodiments, the image may include a representation of a player on a sports team.

In some embodiments, method 300 may include one or more pre-processing determinations to determine whether the image is in a format processable by image processing system 116. For example, in some embodiments, method 300 may include step 304 and step 306.

At step 306, organization computing system 104 may determine whether the image is of a proper size. For example, image processing system 116 may compare the dimensions of the image to an image dimension requirement set by the organization. Using a specific example, image processing system 116 may scan the image to determine whether the image complies with the correct starting dimensions for an image (e.g., 1080×1440, 1440×1440, etc.). If at step 306, image processing system 116 determines that the image does not have the proper image dimensions, then method 300 may proceed to step 308. At step 308, organization computing system 104 may reject the image. In some embodiments, organization computing system 104 may further notify the user of client device 102 that the image must be of a certain dimension prior to upload.

If, however, image processing system 116 determines that the image is of a proper dimension, then method 300 proceeds to step 306. At step 306, organization computing system 104 may determine whether the image complies with naming requirements set by the organization. For example, in some embodiments, the organization may specify that each image must include three identifiers in its name. For example, for a given image, the image's name must comply with the following naming format: <STATSID1, UUID1, OPTAID1.jpeg>. Each identifier in the naming format may correspond to a respective database 120-124.

If, at step 306, image processing system 116 determines that the name of the image does not comply with the naming requirements set by the organization, then method 300 may proceed to step 310. At step 310, organization computing system 104 may reject the image. In some embodiments, organization computing system 104 may further notify the user of client device 102 that the image must comply with the naming requirements set by the organization.

If, however, at step 306, image processing system 116 determines that the name of the image complies with the requirements set by the organization, then method 300 proceeds to step 312.

At step 312, organization computing system 104 may remove the background from the image. For example, image processing system 116 may identify the person of interest in the image (e.g., the player), and may remove background pixels from the image. To remove the background from the image, image processing system 116 may utilize a background removal script that is configured to identify one or more of background pixels and foreground pixels, and may remove the background pixels from the image while retaining the foreground pixels. In some embodiments, to remove the background from the image, image processing system 116 may utilize one or more third party background removal tools, such as, but not limited to, remove.bg. In such embodiments, image processing system 116 may access the functionality of one or more third party background removal tools using one or more APIs.

At step 314, organization computing system 104 may resize the image. For example, following removal of the background pixels from the image, image processing system 116 may resize the image. Resizing module 226 may apply a resizing algorithm to the image to resize the image in accordance with standards defined by the organization.

At step 316, organization computing system 104 may rename the image. For example, following resizing of the image, image processing system 116 may rename the image based on the original name of the image. For example, continuing with the above example, renaming module 236 may generate three image files of the same image. Each image file may be renamed according to one of the identifiers in the original naming convention. Accordingly, renaming module 236 may generate a first image that is renamed <STATSID1.jpeg>; a second image that is renamed <UUID1.jpeg>; and a third image that is renamed <OPTAID1.jpeg>.

At step 318, organization computing system 104 may store each image in the appropriate folder. For example, image processing system 116 may store the first image, <STATSID1.jpeg>, in database 120, the second image, <UUID1.jpeg>, in database 122, and the third image, <OPTAID1.jpeg>, in database 124.

Figures 4A, 4B:
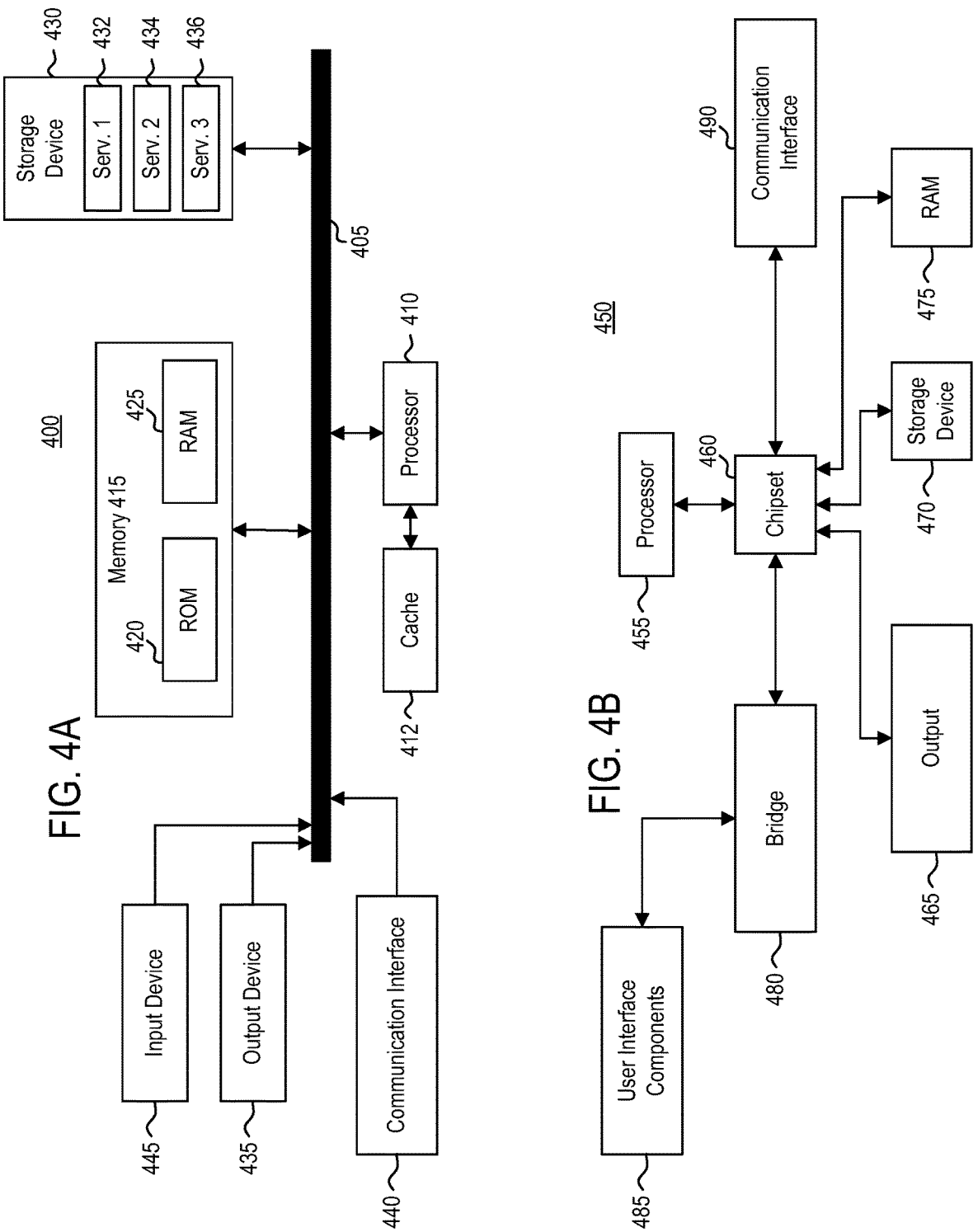
FIG. 4A is a block diagram illustrating a computing device, according to example embodiments.
FIG. 4B is a block diagram illustrating a computing device, according to example embodiments.

FIG. 4A illustrates a system bus architecture of computing system 400, according to example embodiments. System 400 may be representative of at least a portion of organization computing system 104. One or more components of system 400 may be in electrical communication with each other using a bus 405. System 400 may include a processing unit (CPU or processor) 410 and a system bus 405 that couples various system components including the system memory 415, such as read only memory (ROM) 420 and random access memory (RAM) 425, to processor 410. System 400 may include a cache of high-speed memory connected directly with, in close proximity to, or integrated as part of processor 410. System 400 may copy data from memory 415 and/or storage device 430 to cache 412 for quick access by processor 410. In this way, cache 412 may provide a performance boost that avoids processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general purpose processor and a hardware module or software module, such as service 1 432, service 2 434, and service 3 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system 400, an input device 445 may represent any number of input mechanisms, such as a microphone for speech, a touch-sensitive screen for gesture or graphical input, keyboard, mouse, motion input, speech and so forth. An output device 435 may also be one or more of a number of output mechanisms known to those of skill in the art. In some instances, multimodal systems may enable a user to provide multiple types of input to communicate with computing system 400. Communications interface 440 may generally govern and manage the user input and system output. There is no restriction on operating on any particular hardware arrangement and therefore the basic features here may easily be substituted for improved hardware or firmware arrangements as they are developed.

Storage device 430 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 may include services 432, 434, and 436 for controlling the processor 410. Other hardware or software modules are contemplated. Storage device 430 may be connected to system bus 405. In one aspect, a hardware module that performs a particular function may include the software component stored in a computer-readable medium in connection with the necessary hardware components, such as processor 410, bus 405, output device 435 (e.g., display), and so forth, to carry out the function.

FIG. 4B illustrates a computer system 450 having a chipset architecture that may represent at least a portion of organization computing system 104. Computer system 450 may be an example of computer hardware, software, and firmware that may be used to implement the disclosed technology. System 450 may include a processor 455, representative of any number of physically and/or logically distinct resources capable of executing software, firmware, and hardware configured to perform identified computations. Processor 455 may communicate with a chip set 460 that may control input to and output from processor 455. In this example, chipset 460 outputs information to output 465, such as a display, and may read and write information to storage device 470, which may include magnetic media, and solid state media, for example. Chipset 460 may also read data from and write data to storage device 475 (e.g., RAM). A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. In general, inputs to system 450 may come from any of a variety of sources, machine generated and/or human generated.

Chipset 460 may also interface with one or more communication interfaces 490 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 455 analyzing data stored in storage device 470 or storage device 475. Further, the machine may receive inputs from a user through user interface components 485 and execute appropriate functions, such as browsing functions by interpreting these inputs using processor 455.

It may be appreciated that example systems 400 and 450 may have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:

receiving, by a computing system, an image for processing, the image comprising at least a player of interest;

determining, by the computing system, whether the image is of a processable size by comparing a size of the image against a predetermined image size threshold;

determining, by the computing system, that the image complies with a predefined naming standard, the predefined naming standard comprising at least three unique identifiers associated with the image;

executing, by the computing system, in response to determining that the image is of a processable size, an image processing workflow for automatically processing the image in accordance with standards set by an organization associated with the computing system, the executing comprising:

uploading, via the computing system, the image to an image bucket;

detecting, via a notification service, that the image is uploaded to the image bucket;

automatically moving, via the notification service, the image to a queue, where the image is queued for background pixel removal;

identifying one or more background pixels in the image and one or more foreground pixels in the image, wherein the one or more foreground pixels correspond to the player of interest and the one or more background pixels correspond to other portions of the image that are not the player of interest;

removing, via a background module, the one or more background pixels from the image while maintaining the one or more foreground pixels;

after removing the one or more background pixels, resizing, via a resizing module, the image to a set size defined by the organization; and after resizing the image, renaming, via a renaming module, the image to a name format defined by the organization, wherein renaming the image to the name format defined by the organizing comprises generating a first copy of the image and naming the first copy of the image based on a first identifier of the at least three unique identifiers associated with the image; and after executing the image processing workflow, saving, by the computing system, the image to a database for retrieval, wherein saving the image to the database for retrieval comprises saving the first copy of the image to a first database dedicated to identifiers of a first type associated with the first identifier, and wherein the uploading, the detecting, the automatic moving, the removing, the resizing, and the renaming are performed without user intervention.

2. The method of claim 1, wherein renaming, via the renaming module, the image to the name format defined by the organization further comprises:

generating a second copy of the image and naming the second copy of the image based on a second identifier of the at least two three unique identifiers associated with the image; and generating a third copy of the image and naming the third copy of the image based on a third identifier of the at least three unique identifiers associated with the image.

3. The method of claim 2, wherein saving, by the computing system, the image to the database for retrieval further comprises:

saving the second copy of the image to a second database dedicated to second identifiers of a second type associated with the second identifier; and saving the third copy of the image to a third database dedicated to third identifiers of a third type associated with the third identifier.

4. The method of claim 1, wherein removing, via the background module, the background pixels from the image comprises:

accessing a third party background removal script to remove the background pixels from the image.

5. A non-transitory computer readable medium comprising one or more sequences of instructions, which, when executed by one or more processors, causes a computing system to perform operations comprising:

receiving, by the computing system, an image for processing, the image comprising at least a player of interest;

determining, by the computing system, whether the image is of a processable size by comparing a size of the image against a predetermined image size threshold;

determining, by the computing system, that the image complies with a predefined naming standard, the predefined naming standard comprising at least three unique identifiers associated with the image;

executing, by the computing system, in response to determining that the image is of a processable size, an image processing workflow for automatically processing the image in accordance with standards set by an organization associated with the computing system, the executing comprising:

uploading, via the computing system, the image to an image bucket;

detecting, via a notification service, that the image is uploaded to the image bucket;

automatically moving, via the notification service, the image to a queue, where the image is queued for background pixel removal;

identifying one or more background pixels in the image and one or more foreground pixels in the image, wherein the one or more foreground pixels correspond to the player of interest and the one or more background pixels correspond to other portions of the image that are not the player of interest;

removing, via a background module, the one or more background pixels from the image while maintaining the one or more foreground pixels;

after removing the one or more background pixels, resizing, via a resizing module, the image to a set size defined by the organization; and after resizing the image, renaming, via a renaming module, the image to a name format defined by the organization, wherein renaming the image to the name format defined by the organizing comprises generating a first copy of the image and naming the first copy of the image based on a first identifier of the at least three unique identifiers associated with the image; and after executing the image processing workflow, saving, by the computing system, the image to a database for retrieval, wherein saving the image to the database for retrieval comprises saving the first copy of the image to a first database dedicated to identifiers of a first type associated with the first identifier, and wherein the uploading, the detecting, the automatic moving, the removing, the resizing, and the renaming are performed without user intervention.

6. The non-transitory computer readable medium of claim 5, wherein renaming, via the renaming module, the image to the name format defined by the organization further comprises:

generating a second copy of the image and naming the second copy of the image based on a second identifier of the at least three unique identifiers associated with the image; and generating a third copy of the image and naming the third copy of the image based on a third identifier of the at least three unique identifiers associated with the image.

7. The non-transitory computer readable medium of claim 6, wherein saving, by the computing system, the image to the database for retrieval further comprises:

saving the second copy of the image to a second database dedicated to second identifiers of a second type associated with the second identifier; and saving the third copy of the image to a third database dedicated to third identifiers of a third type associated with the third identifier.

8. The non-transitory computer readable medium of claim 5, wherein removing, via the background module, the background pixels from the image comprises:

accessing a third party background removal script to remove the background pixels from the image.

9. A system, comprising:

a notification service;

a processor; and a memory having programming instructions stored thereon, which, when executed by the processor, causes the system to perform operations comprising:

receiving an image for processing, the image comprising at least a player of interest;

determining whether the image is of a processable size by comparing a size of the image against a predetermined image size threshold;

determining that the image complies with a predefined naming standard, the predefined naming standard comprising at least three unique identifiers associated with the image;

executing, in response to determining that the image is of a processable size, an image processing workflow for automatically processing the image in accordance with standards set by an organization associated with the system, the executing comprising:

uploading the image to an image bucket;

detecting, via the notification service, that the image is uploaded to the image bucket;

automatically moving, via the notification service, the image to a queue, where the image is queued for background pixel removal;

identifying one or more background pixels in the image and one or more foreground pixels in the image, wherein the one or more foreground pixels correspond to the player of interest and the one or more background pixels correspond to other portions of the image that are not the player of interest;

removing, via a background module, the one or more background pixels from the image while maintaining the one or more foreground pixels;

after removing the one or more background pixels, resizing, via a resizing module, the image to a set size defined by the organization; and after resizing the image, renaming, via a renaming module, the image to a name format defined by the organization, wherein renaming the image to the name format defined by the organizing comprises generating a first copy of the image and naming the first copy of the image based on a first identifier of the at least three unique identifiers associated with the image; and after executing the image processing workflow, saving, by the computing system, the image to a database for retrieval, wherein saving the image to the database for retrieval comprises saving the first copy of the image to a first database dedicated to identifiers of a first type associated with the first identifier, and wherein the uploading, the detecting, the automatic moving, the removing, the resizing, and the renaming are performed without user intervention.

10. The system of claim 9, wherein renaming, via the renaming module, the image to the name format defined by the organization further comprises:

generating a second copy of the image and naming the second copy of the image based on a second identifier of the at least three unique identifiers associated with the image; and generating a third copy of the image and naming the third copy of the image based on a third identifier of the at least three unique identifiers associated with the image.

11. The system of claim 10, wherein saving the image to the database for retrieval further comprises:

saving the second copy of the image to a second database dedicated to second identifiers of a second type associated with the second identifier; and saving the third copy of the image to a third database dedicated to third identifiers of a third type associated with the third identifier.

12. The system of claim 9, wherein removing, via the background module, the background pixels from the image comprises:

accessing a third party background removal script to remove the background pixels from the image.

13. The method of claim 1, wherein resizing the image includes:

generating, by the computing system, a resized image; and replacing, by the computing system, the image with the resized image for saving in the database.

14. The non-transitory computer readable medium of claim 5, wherein resizing the image includes:

generating, by the computing system, a resized image; and replacing, by the computing system, the image with the resized image for saving in the database.

15. The system of claim 9, wherein resizing the image includes:

generating, by the computing system, a resized image; and replacing, by the computing system, the image with the resized image for saving in the database.

* * * * *